(12) United States Patent
Takeshita et al.

(10) Patent No.: US 7,991,292 B2
(45) Date of Patent: Aug. 2, 2011

(54) TERMINAL AND INFORMATION RELAY APPARATUS

(75) Inventors: Masahiro Takeshita, Daito (JP); Yasunari Miyake, Daito (JP); Koichi Ishimoto, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 841 days.

(21) Appl. No.: 12/030,738

(22) Filed: Feb. 13, 2008

(65) Prior Publication Data

US 2008/0199184 A1  Aug. 21, 2008

(30) Foreign Application Priority Data

Feb. 15, 2007 (JP) .................................. 2007-035114

(51) Int. Cl.
*H04B 10/10* (2006.01)
(52) U.S. Cl. ........................................ 398/115; 398/166
(58) Field of Classification Search .......... 398/115–118, 398/166
See application file for complete search history.

(56) References Cited

U.S. PATENT DOCUMENTS

2004/0248514 A1* 12/2004 Idani et al. .................... 455/41.2
2005/0193199 A1   9/2005 Asokan et al.

FOREIGN PATENT DOCUMENTS

| EP | 1 395 019 | 3/2004 |
| EP | 1 467 519 | 10/2004 |
| EP | 1 536 609 | 6/2005 |
| EP | 1 708 528 | 10/2006 |
| JP | 2003-229872 | 8/2003 |
| JP | 2005-65018 | 3/2005 |
| JP | 2005-303459 | 10/2005 |
| JP | 2006-135874 | 5/2006 |
| WO | WO-99/41876 | 8/1999 |

OTHER PUBLICATIONS

Patent Abstracts of Japan for Japanese Publication No. 2006-135874, Publication date May 25, 2006 (1 page).
Patent Abstracts of Japan for Japanese Publication No. 2003-229872, Publication date Aug. 15, 2003 (2 pages).
Patent Abstracts of Japan for Japanese Publication No. 2005-065018, Publication date Mar. 10, 2005 (1 page).
Patent Abstracts of Japan for Japanese Publication No. 2005-303459, Publication date Oct. 27, 2005 (1 page).
Extended European Search Report for European Application No. 08002293.2-2415, mailed on Jun. 5, 2008 (6 pages).

* cited by examiner

*Primary Examiner* — Leslie Pascal
(74) *Attorney, Agent, or Firm* — Osha Liang LLP

(57) ABSTRACT

A terminal and an information relay apparatus allowing automatic setup for wireless connection without requiring setup operation by the user and capable of preventing information leakage when used at home are provided. A wireless LAN terminal communicates with a wireless access point relaying information to and from a communication apparatus constituting a communication network. Wireless LAN terminal includes an ROM, an optical communication block, a communication unit, and a CPU. The optical communication block is for optical communication. Communication unit is for communication by radio signal. CPU causes the optical communication unit to transmit a start request signal. After transmission of the start request signal, when the optical communication block receives an information request signal, CPU causes the optical communication block to transmit identification information stored in ROM. After the optical communication block transmits the identification information, CPU causes the communication unit to transmit log-in request and the like.

10 Claims, 6 Drawing Sheets

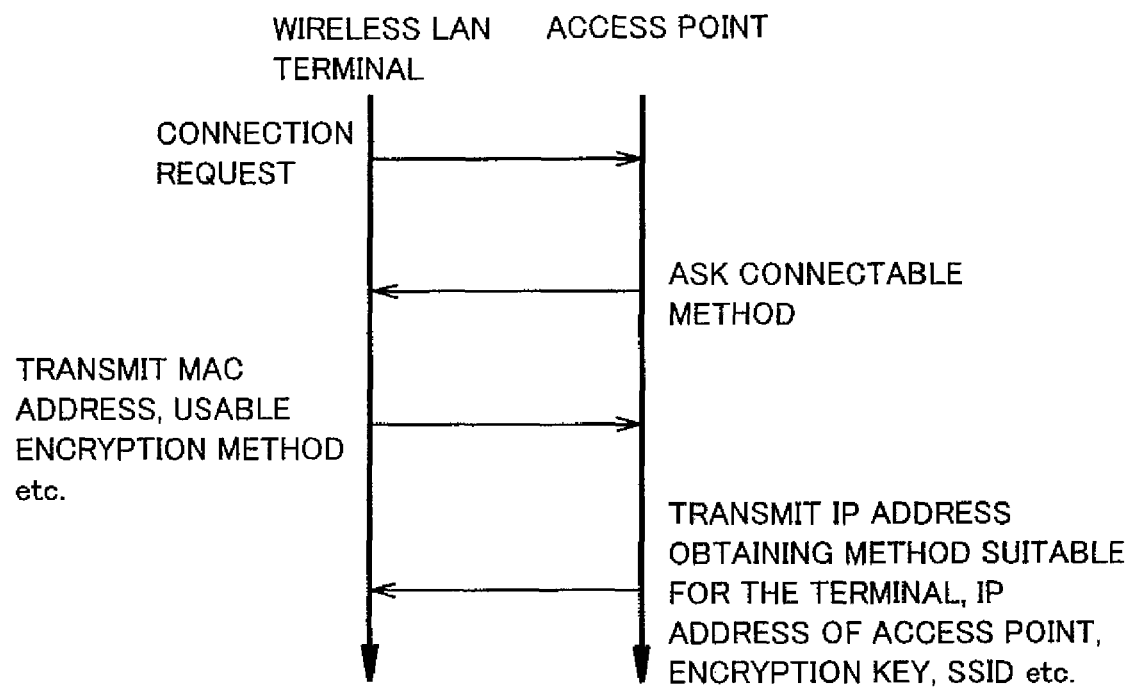

TERMINAL AND INFORMATION RELAY APPARATUS

BACKGROUND OF THE INVENTION

1. Field of the Invention

The present invention relates to a terminal and an information relay apparatus and, more specifically, to a terminal and an information relay apparatus allowing remote connection.

2. Description of the Background Art

Japanese Patent Laying-Open No. 2005-303459 discloses an access point connected to wired LAN (Local Area Network) establishing a connection with an external wireless LAN in compliance with a prescribed wireless LAN specification, serving as an interface with the wired LAN. The access point gets a first ID data in non-contact manner different from the wireless LAN specification and, upon request for connection from the wireless LAN terminal in compliance with wireless LAN specification, gets a second ID data transmitted with the connection request, and establishes connection to the wireless LAN on condition that the first and second ID data are the same.

According to the invention disclosed in Japanese Patent Laying-Open No. 2005-303459, a terminal that uses wireless LAN can be added while preventing leakage of data representing encryption key.

Japanese Patent Laying-Open No. 2005-065018 discloses a wireless LAN connection system connecting a wireless terminal to wireless LAN through an access point. The wireless LAN system includes a setup information distribution server and a wireless terminal. The setup information distribution server transmits setup information for connection to the wireless LAN. The wireless terminal receives radio wave from the access point, extracts an access point ID from the radio wave, receives setup information from the setup information distribution server, transmits the setup information and the access point ID to the access point, and receives a connection approval signal to wireless LAN from the access point.

According to the invention disclosed in Japanese Patent Laying-Open No. 2005-065018, the number of necessary steps to connect a wireless terminal to a wireless LAN can be reduced.

Japanese Patent Laying-Open No. 2003-229872 discloses a communication apparatus for wireless communication with other electronic apparatuses in accordance with a prescribed wireless communication specification. The communication apparatus includes a wireless communication unit, a detecting unit, a reading unit and a setup unit. The wireless communication unit communicates wirelessly with other electronic apparatus, in accordance with a prescribed wireless communication specification. The detecting unit detects presence of any information recoding medium recording setup information necessary for wireless connection with other electronic apparatus. The reading unit reads the setup information through non-contact communication, from the information recording medium detected by the detecting unit. The setup unit adjusts setup of the wireless communication unit in accordance with the setup information read by the reading unit.

According to the invention disclosed in Japanese Patent Laying-Open No. 2003-229872, the setup for wireless connection can be automatically executed, eliminating troublesome setting operation by the user.

Japanese Patent Laying-Open No. 2006-135874 discloses a communication control information setup system of a wireless portable terminal, including a cradle apparatus, an authentication apparatus and a transfer apparatus. The cradle apparatus feeds power to the wireless portable terminal when the terminal is placed thereon. The authentication apparatus authenticates the wireless portable terminal, using start of power feed to the wireless portable terminal as a trigger. If authentication succeeds, the transfer apparatus automatically transfers various pieces of communication control information necessary for the wireless portable terminal to execute communication control.

According to the invention disclosed in Japanese Patent Laying-Open No. 2006-135874, setup of communication control information required before communication of the wireless portable terminal can be executed in a safe and simple manner at any time, any place.

The invention disclosed in Japanese Patent Laying-Open No. 2005-303459, however, still has room for improvement as regards the capability of preventing leakage of information.

The invention disclosed in Japanese Patent Laying-Open No. 2005-065018 is disadvantageous since home use is difficult.

The invention disclosed in Japanese Patent Laying-Open No. 2003-229872 does not specifically address measures to prevent information leakage.

The invention disclosed in Japanese Patent Laying-Open No. 2006-135874 requires communication through a joint that is physically joined and, therefore, it has poor versatility and requires troublesome work by the user for use at home.

The present invention was made to solve the above-described problems and its object is to provide a terminal and an information relay apparatus allowing automatic setup for wireless connection without requiring troublesome setup operation by the user and capable of well preventing information leakage when used at home.

SUMMARY OF THE INVENTION

According to an aspect, a terminal communicating with an information relay apparatus relaying information to and from a communication apparatus constituting a communication network is provided. The terminal includes: a storage unit configured to store identification information; an optical communication unit configured to communicate with the information relay apparatus by an optical signal; a radio communication unit configured to communicate with the information relay apparatus by a radio signal; and a control unit configured to control the optical communication unit and the radio communication unit. The control unit includes: a request control unit configured to cause the optical communication unit to transmit a start request signal requesting start of communication by the optical communication unit to the information relay apparatus; a transmission control unit configured to cause, after transmission of the start request signal, when the optical communication unit receives an information request signal requesting transmission of the identification information, the optical communication unit to transmit a signal representing the identification information stored in the storage unit; a log-in control unit configured to cause, after the optical communication unit transmitted the identification information, the radio communication unit to transmit a log-in request and the identification information as a signal; and a communication control unit configured to cause, when the radio communication unit receives a signal indicating log-in permission, the radio communication unit to communicate information.

According to another aspect, an information relay apparatus relaying information between a terminal and a communication apparatus constituting a communication network is provided. The information relay apparatus includes: an optical communication unit configured to communicate with the terminal by an optical signal; a storage unit configured to store identification information of the terminal; a radio communication unit configured to communicate with the terminal by a radio signal; a network communication unit configured to communicate with the communication apparatus; and a control unit configured to control the optical communication unit, the storage unit, the radio communication unit and the network communication unit. The control unit includes: a transmission control unit configured to cause, when a start request signal requesting start of communication by the optical communication unit is received from the terminal, the optical communication unit to transmit an information request signal requesting the identification information of the terminal to the terminal; a storage control unit configured to cause the storage unit to store the identification information of the terminal received by the optical communication unit; and a relay control unit configured to cause, after the storage unit stored the identification information of the terminal, if the identification information received as a signal of log-in request and the identification information by the radio communication unit and stored in the storage unit matches the identification information received by the radio communication unit, the radio communication unit and the network communication unit to relay information communication between the communication apparatus and the terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 illustrates contents of communication in the wireless LAN system in accordance with the embodiment of the present invention.

DESCRIPTION OF THE PREFERRED EMBODIMENTS

Figure 1:
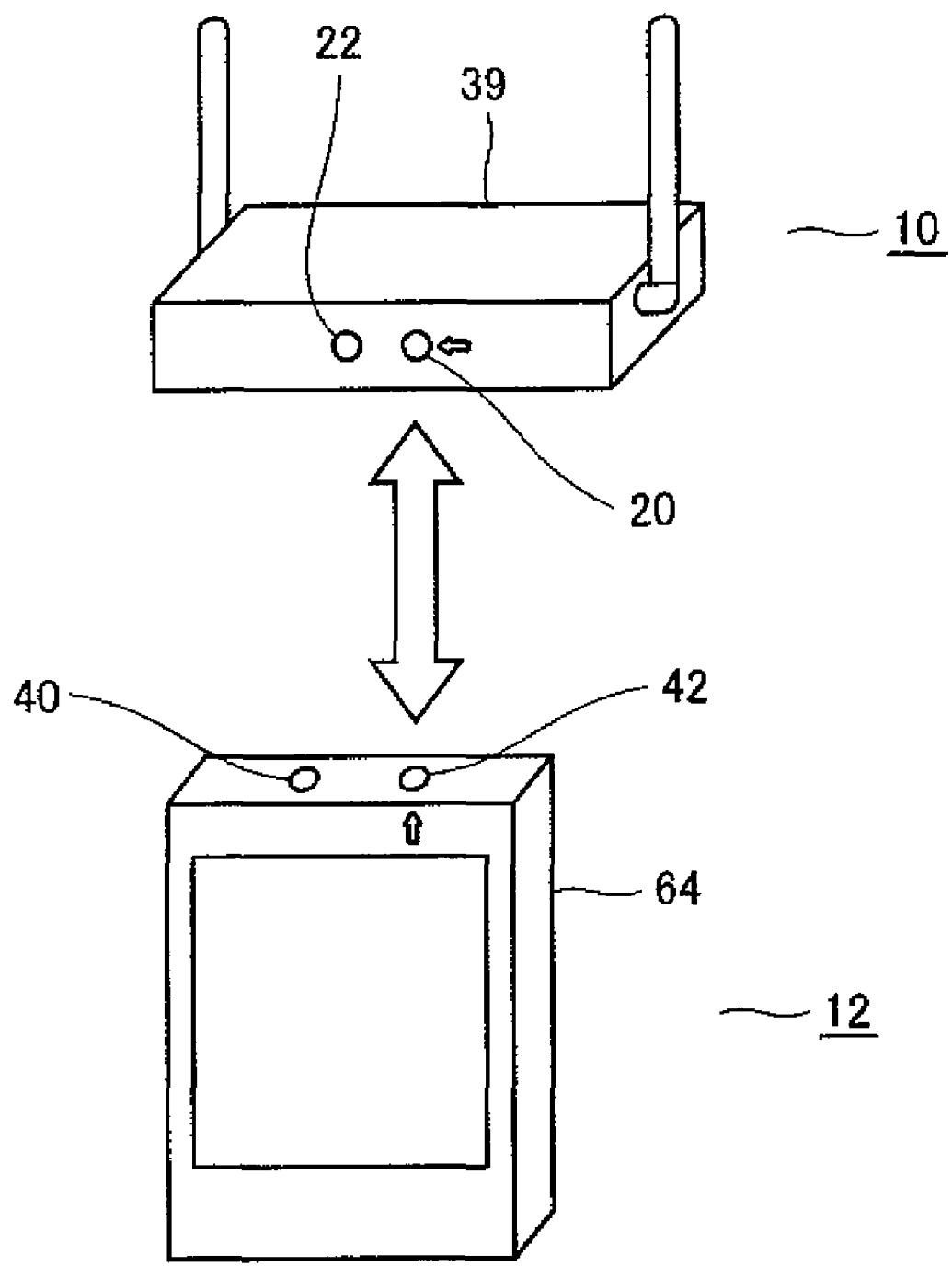
FIG. 1 shows a configuration of a wireless LAN system in accordance with an embodiment of the present invention.

In the following, embodiments of the present invention will be described with reference to the figures. In the following description, the same components are denoted by the same reference characters. Their names and functions are also the same. Therefore, detailed description thereof will not be repeated.

FIG. 1 shows a configuration of the wireless LAN system in accordance with the present embodiment. Referring to FIG. 1, the wireless LAN system in accordance with the present embodiment includes a wireless access point 10 and a wireless LAN terminal 12. Wireless access point 10 is an information relay apparatus relaying information between wireless LAN terminal 12 and the Internet, not shown. Wireless LAN terminal displays information received from wireless access point 10, and transmits information input by a user to wireless access point 10.

On a housing 64 of wireless LAN terminal 12, an arrow is formed to indicate a position of light emission by a light emitting unit 42, which will be described later. On a housing 39 of wireless access point 10, an arrow is formed to indicate a position of light reception by a light receiving unit 20, which will be described later.

Figure 2:
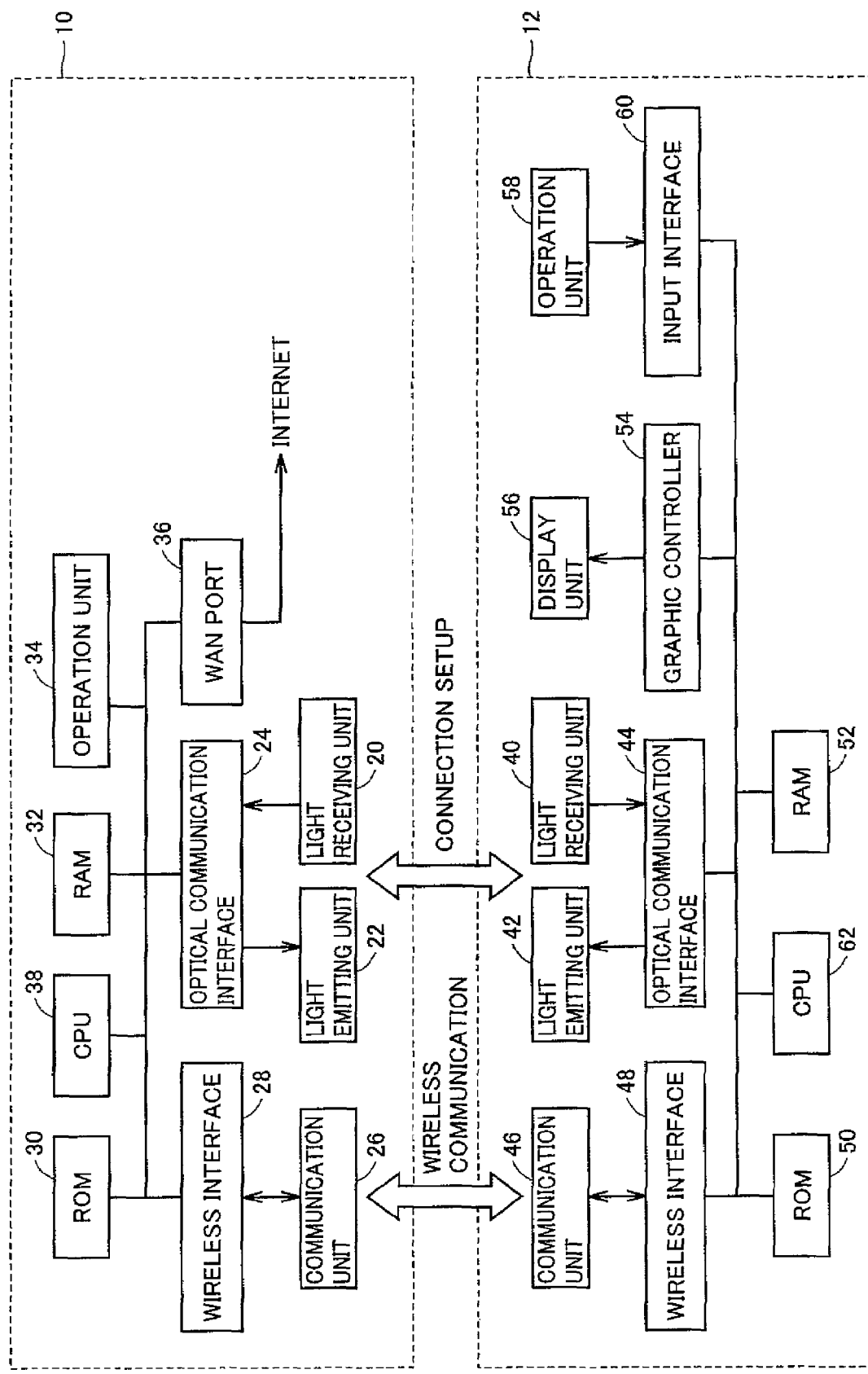
FIG. 2 shows configurations of a wireless access point and a wireless LAN terminal in accordance with an embodiment of the present invention.

FIG. 2 shows configurations of wireless access point 10 and wireless LAN terminal 12. Referring to FIG. 2, wireless access point 10 in accordance with the present embodiment includes a light receiving unit 20, a light emitting unit 22, an optical communication interface 24, a communication unit 26, a wireless interface 28, an ROM (Read Only Memory) 30, an RAM (Random Access Memory) 32, an operation unit 34, a WAN (Wide Area Network) port 36, and a CPU (Central Processing Unit) 38.

Light receiving unit 20 is for receiving an optical signal from wireless LAN terminal 12 and outputting an electric signal. Light emitting unit 22 is for receiving the input electric signal and transmitting an optical signal to wireless LAN terminal 12. In the present embodiment, the "optical signal" refers to a signal using light as a medium. In the present embodiment, the light used as the medium is infrared ray having the wavelength of 0.7 micrometer to 2.5 micrometer. Needless to say, infrared ray of other wavelength or visible light may be used as the medium, in place of such infrared ray. Light receiving unit 20 and light emitting unit 22 constitute an optical communication block for communication through optical signals with wireless LAN terminal 12. The communication format of the optical communication block is determined in advance. The optical communication block communicates information as signals in accordance with the format, with the optical communication block of wireless access point 10.

Optical communication interface 24 converts the electric signal output by light receiving unit 20 to an electric signal usable by CPU 38, and converts the electric signal usable by CPU 38 to an electric signal usable by light emitting unit 22. Communication unit 26 is for communication with wireless LAN terminal 12 through radio signals. In the present embodiment, the "radio signal" refers to a signal using radio wave as a medium. Wireless interface 28 converts the electric signal output by communication unit 26 to an electric signal usable by CPU 38, and converts the signal usable by CPU 38 to an electric signal usable by communication unit 26.

ROM 30 stores a program to be executed by CPU 38. When CPU 38 executes the program stored in ROM 30, wireless access point 10 shown in FIG. 2 comes to operate as the information relay apparatus in accordance with the present embodiment. RAM 32 temporarily stores information to be utilized by CPU 38. Operation unit 34 is for receiving a user input by generating a signal in accordance with a user operation. An input interface, not shown, is included in operation unit 34. This allows generation of a signal in accordance with a user operation. WAN port 36 communicates with a communication apparatus constituting the Internet, not shown. CPU 38 controls various units of wireless access point 10. CPU 38 also performs operation for the control.

Figure 3:
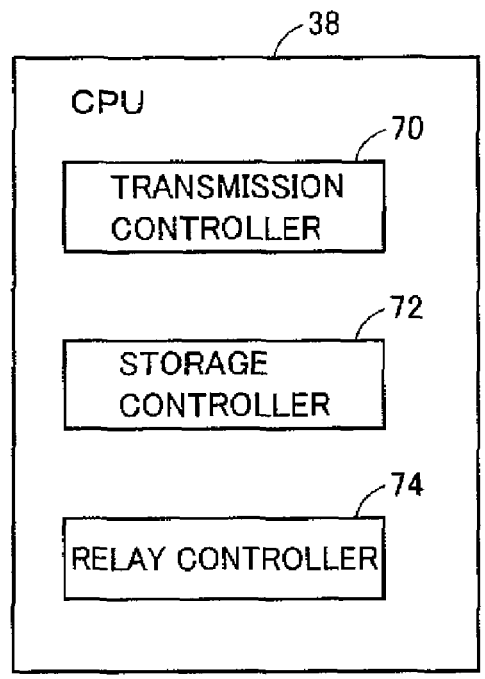
FIG. 3 is a functional block diagram of a CPU of the wireless access point in accordance with an embodiment of the present invention.

FIG. 3 is a functional block diagram representing functions realized by CPU 38. Referring to FIG. 3, the functions realized by CPU 38 includes a transmission control unit 70, a storage control unit 72, and a relay control unit 74. Transmission control unit 70 controls light emitting unit 22 through optical communication interface 24 such that, upon reception of a start request signal from the terminal, light emitting unit 22 transmits an information request signal to wireless LAN terminal 12. Storage control unit 72 causes RAM 32 to store identification information of wireless LAN terminal 12 received by light receiving unit 20. After RAM 32 has stored the identification information of wireless LAN terminal 12, communication unit 26 receives a log-in request and the identification information as signals, and if the identification information stored by RAM 32 matches the identification information received by communication unit 26, relay control unit 74 causes communication unit 26 and WAN port 36 to relay information communication between wireless LAN terminal 12 and the communication apparatus constituting the Internet.

Again referring to FIG. 2, wireless LAN terminal 12 includes a light receiving unit 40, a light emitting unit 42, an optical communication interface 44, a communication unit 46, a wireless interface 48, an ROM 50, an RAM 52, a graphic controller 54, a display unit 56, an operation unit 58, an input interface 60, and a CPU 62.

Light receiving unit 40 is for receiving an optical signal from wireless access point 10 and outputting an electric signal. Light emitting unit 42 is for receiving the input electric signal and transmitting an optical signal to wireless access point 10. Light receiving unit 40 and light emitting unit 42 constitute an optical communication block for communication with wireless access point 10 through optical signals. Optical communication interface 44 converts the electric signal output by light receiving unit 40 to an electric signal usable by CPU 62, and converts the electric signal usable by CPU 62 to an electric signal usable by light emitting unit 42. Communication unit 46 is for communication with wireless access point 10 through radio wave. Wireless interface 48 converts the electric signal output by communication unit 46 to an electric signal usable by CPU 62, and converts the electric signal usable by CPU 62 to an electric signal usable by communication unit 46.

ROM 50 stores a program to be executed by CPU 62 and information necessary for communication with wireless access point 10. When CPU 62 executes the program stored in ROM 50, wireless LAN terminal 12 shown in FIG. 2 comes to operate as the wireless LAN terminal in accordance with the present embodiment. In the present embodiment, part of ROM 50 is realized as a flash memory. Therefore, even when power supply to wireless LAN terminal 12 stops, information can be retained by the flash memory and the information stored in the flash memory can be rewritten.

RAM 52 temporarily stores information to be utilized by CPU 62. Graphic controller 54 converts information handled by CPU 62 to information that can be displayed by display unit 56. Operation unit 58 is for receiving user input. Input interface 60 generates an electric signal in accordance with a user operation through operation unit 58.

Figure 4:
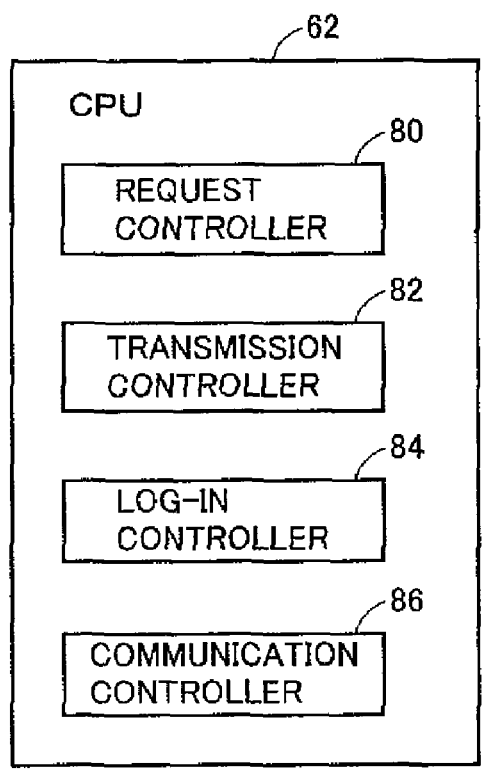
FIG. 4 is a functional block diagram of a CPU of the wireless LAN terminal in accordance with an embodiment of the present invention.

FIG. 4 is a block diagram representing functions realized by CPU 62. Referring to FIG. 4, the functions realized by CPU 62 includes a request control unit 80, a transmission control unit 82, a log-in control unit 84, and a communication control unit 86. Request control unit 80 causes light emitting unit 42 to transmit a start request signal to wireless access point 10. After the start request signal is transmitted and light receiving unit 40 receives the information request signal, transmission control unit 82 causes light emitting unit 42 to transmit the signal indicating the identification information stored by ROM 50. Log-in control unit 84 causes, after the light emitting unit 42 transmits the identification information, communication unit 46 to transmit a log-in request and the identification information as signals. When communication unit 46 receives a signal permitting log-in, communication control unit 86 causes communication unit 46 to further communicate information input by the user through an operation of operation unit 58 and other pieces of information.

Figure 5:
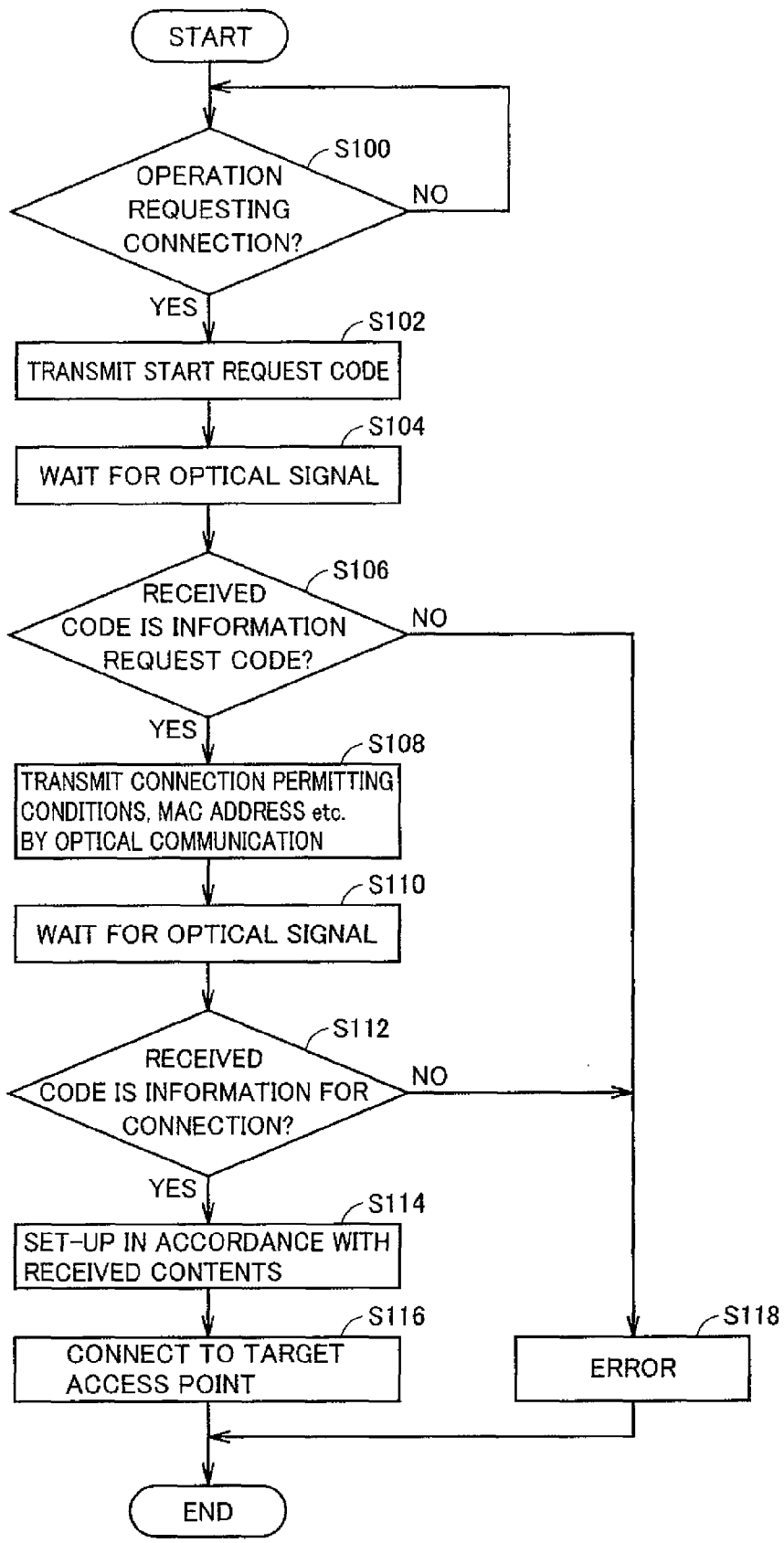
FIG. 5 is a flowchart representing control procedure of a connection establishing process in the wireless LAN terminal in accordance with the embodiment of the present invention.

Referring to FIG. 5, the program executed by wireless LAN terminal 12 executes such control as described below, to establish connection.

At step S100, CPU 62 operating as request control unit 80 determines, based on the electric signal output from input interface 60, whether an operation requesting connection to wireless access point 10 has been made on operation unit 58 or not. If CPU 62 determines that such an operation has been made (YES at step S100), the process proceeds to step S102. Otherwise (NO at step S100), the process returns to step S100.

At step S102, CPU 62 operating as request control unit 80 outputs a signal to optical communication interface 44. Optical interface 44 converts the electric signal output by CPU 62 to a signal usable by light emitting unit 42 and outputs the signal to light emitting unit 42. When optical interface 44 outputs the electric signal, light emitting unit 42 transmits an optical signal to wireless access point 10. This signal is a start request code requesting start of communication by the optical communication block to wireless access point 10.

At step S104, light receiving unit 40 waits for the optical signal from wireless access point 10. Upon reception of the optical signal, light receiving unit 40 converts the signal to an electric signal and outputs the same. Optical communication interface 44 converts the electric signal output from light receiving unit 40 to an electric signal usable by CPU 62, and outputs the converted electric signal to CPU 62.

At step S106, CPU 62 operating as transmission control unit 82 determines whether the electric signal output by optical communication interface 44 is an information request code requesting transmission of the identification information or not. If CPU 62 determines that the electric signal indicates the information request code (YES at step S106), the process proceeds to step S108. Otherwise (NO at step S106), the process proceeds to step S118.

At step S108, CPU 62 operating as transmission control unit 82 reads information indicating conditions for permitting connection, information of encryption method usable by wireless LAN terminal 12, MAC address (Media Access Control address) and the like, from ROM 50. When such pieces of information are read, CPU 62 outputs a signal indicating identification information of these, to optical communication interface 44. Optical communication interface 44 converts the electric signal output from CPU 62 to a signal usable by light emitting unit 42 and outputs the signal to light emitting unit 42. When optical communication interface 44 outputs the electric signal, light emitting unit 42 transmits an optical signal indicating information thereof to wireless access point 10.

At step S110, light receiving unit 40 waits for the optical signal from wireless access point 10. Upon reception of the optical signal, light receiving unit 40 converts the signal to an electric signal and outputs the same. Optical communication interface 44 converts the electric signal output from light receiving unit 40 to an electric signal usable by CPU 62, and outputs the signal to CPU 62.

At step S112, CPU 62 operating as transmission control unit 82 determines whether or not the optical signal output from optical communication interface 44 represents information necessary for connection with wireless access point 10. If CPU 62 determines that the optical signal represents such information (YES at step S112), the process proceeds to step S114. Otherwise (NO at step S112), the process proceeds to step S118.

At step S114, CPU 62 operating as transmission control unit 82 performs setup for connection to wireless access point 10, based on the information received at step S110.

At step S116, CPU 62 operating as log-in control unit 84 outputs a signal to wireless interface 84 in accordance with a procedure indicated by the program stored in ROM 50. When CPU 62 outputs the signal, wireless interface 84 converts the signal to a signal usable by communication unit 46. Communication unit 46 transmits the signal output from wireless interface 48 as a radio signal to wireless access point 10. Receiving the radio signal from wireless access point 10, communication unit 46 outputs the signal as an electric signal. When communication unit 46 outputs the signal, wireless interface 48 converts the signal to a signal usable by CPU 62. CPU 62 performs control based on the signal output by wireless interface 44. By the repetition of these processes, connection to wireless access point 10 is established. The pieces of information transmitted as signals in these processes include information indicating log-in request, identification information such as MAC address and the like.

At step S118, CPU 62 operating as transmission control unit 82 outputs a signal for error indication, to graphic controller 54. Graphic controller 54 converts the signal to a signal usable by display unit 56, and outputs the converted signal to display unit 56. When graphic controller 54 outputs the signal, display unit 56 provides the error indication.

Figure 6:
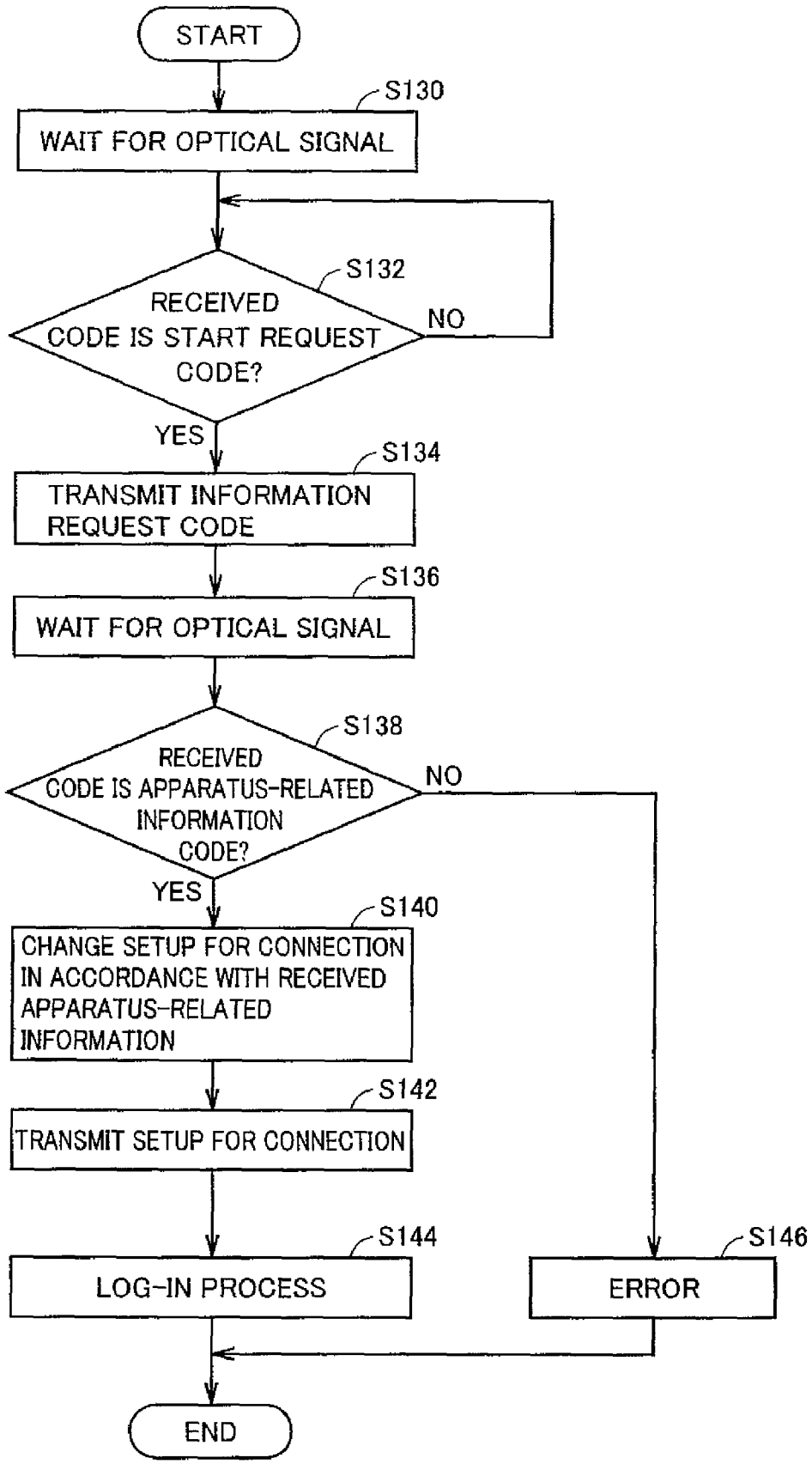
FIG. 6 is a flowchart representing control procedure of a connection establishing process in the wireless access point in accordance with the embodiment of the present invention.

Referring to FIG. 6, the program executed by wireless access point 10 executes such a control as described below, in establishing connection.

At step S130, light receiving unit 20 waits for an optical signal from wireless LAN terminal 12. Receiving the optical signal, light receiving unit 20 converts the signal to an electric signal and outputs the electric signal. Optical communication interface 24 converts the electric signal output from light receiving unit 20 to an electric signal usable by CPU 38, and outputs the signal to CPU 38.

At step S132, CPU 38 operating as transmission control unit 70 determines whether or not the electric signal output from optical communication interface 24 is a start request code. If CPU 38 determines that the electric signal is a start request code (YES at step S132), the process proceeds to step S134. Otherwise (NO at step S132), the process returns to step S132.

At step S134, CPU 38 operating as transmission control unit 70 outputs a signal to optical communication interface 24. The signal indicates an information request code. Optical communication interface 24 converts the electric signal output from CPU 38 to a signal usable by light emitting unit 22, and outputs the signal to light emitting unit 22. When optical communication interface 24 outputs the electric signal, light emitting unit 22 transmits an optical signal indicating the information request code to wireless LAN terminal 12.

At step S136, light receiving unit 20 waits for an optical signal from wireless LAN terminal 12. Receiving the optical signal, light receiving unit 20 converts the signal to an electric signal, and outputs the converted signal. Optical communication interface 24 converts the electric signal output from light receiving unit 20 to an electric signal usable by CPU 38, and outputs the signal to CPU 38.

At step S138, CPU 38 operating as transmission control unit 70 determines whether or not the electric signal output from optical communication interface 24 is a signal representing pieces of information such as the information representing conditions for permitting connection, information of encryption method usable by wireless LAN terminal 12 or information for identifying MAC address. If CPU 38 determines that the electric signal represents such information (YES at step S138), the process proceeds to step S140. Otherwise NO at step S138), the process proceeds to step S146.

At step S140, CPU 38 operating as storage control unit 72 changes various set-ups for connection to wireless LAN terminal 12, based on the information received at step S138. At that time, CPU 38 causes RAM 32 to store the identification information represented by the signal output by optical communication interface.

At step S142, CPU 38 operating as relay control unit 74 outputs pieces of information stored in RAM 32 or ROM 30 as a signal to optical communication unit 24. Such pieces of information represent information necessary for wireless LAN terminal 12 to establish connection to wireless access point 10. By way of example, the pieces of information include IP (Internet Protocol) address, SSID (Service Set Identifier) and an encryption key. When CPU 38 outputs the signal, optical communication interface 24 converts the signal to a signal usable by light emitting unit 22. Light emitting unit 22 transmits the signal output by optical communication interface 24 as an optical signal to wireless LAN terminal 12.

At step S144, communication unit 26 receives a radio signal from wireless LAN terminal 12 and outputs the signal as an electric signal. When communication unit 26 outputs the signal, wireless interface 28 converts the signal to a signal usable by CPU 38. When wireless interface 28 outputs the signal, CPU 38 operating as relay control unit 74 determines whether or not the output signal represents information indicating log-in request and identification information. When the output signal represents the log-in request information and identification information, CPU 38 determines whether or not the identification information matches the identification information received at step S136 and stored in RAM 32 at step. S140. When the output signal does not represent the log-in request information and the identification information, CPU 38 executes a process as indicated by the information of the signal. When the output signal indicates the log-in request information and the identification information and the identification information matches the identification information stored in RAM 32 at step S140, CPU 38 performs a process for relaying information communication between wireless LAN terminal 12 and a communication apparatus constituting the Internet, that is, the log-in process. The process includes a process of controlling WAN port 36 for starting communication with the communication apparatus constituting the Internet, and a process of controlling the optical communication block and WAN port 36 after the start of communication with the communication apparatus constituting the Internet.

At step S146, CPU 38 operating as transmission control unit 70 outputs a signal to optical communication interface 24. The signal indicates an error code. Optical communication interface 24 converts the electric signal output from CPU 38 to a signal usable by light emitting unit 22, and outputs the signal to light emitting unit 22. When optical communication interface 24 outputs the electric signal, light emitting unit 22 transmits an optical signal indicating the error code to wireless LAN terminal 12.

FIG. 7 illustrates contents of communication in the wireless LAN system. Referring to FIG. 7, the operation of wireless LAN system based on the structure and flowcharts as above will be described.

CPU 62 of wireless LAN terminal 12 determines, based on the electric signal output from input interface 60, whether or not an operation requesting connection to wireless access point 10 has been made on operation unit 58 (step S100). If such an operation has been done (YES at step S100), CPU 62 causes light emitting unit 42 to transmit a start request code (step S102).

Light receiving unit 20 of wireless access point 10 waits for the optical signal from wireless LAN terminal 12 (step S130). When light receiving unit 20 receives the optical signal, CPU 38 determines whether or not the electric signal output from optical communication interface 24 is a start request code (step S132). If the electric signal is determined to be the start request code (YES at step S132), CPU 38 causes light emitting unit 22 to transmit an optical signal indicating an information request code, to wireless LAN terminal 12 (step S134).

When light receiving unit 40 receives the optical signal (step S104), CPU 62 of wireless LAN terminal 12 determines whether or not the signal indicates the information request code (step S106). If the signal indicates the information request code (YES at step S106), CPU 62 causes light transmitting unit 42 to transmit a signal indicating identification information to wireless access point 10 (step S108).

When light receiving unit 20 of wireless access point 10 receives the optical signal from wireless LAN terminal 12 (step S136), CPU 38 determines whether the electric signal output from optical communication interface 24 is a signal representing pieces of information such as the information representing conditions for permitting connection, information for identifying MAC address and the like (step S138). If the signal represents the identification information (YES at step S138), CPU 38 changes various set-ups for connection to wireless LAN terminal 12 based on the information received at step S138 (step S140). After the changes of set-up, CPU causes light emitting unit 22 to transmit information necessary for wireless LAN terminal 12 to establish connection with wireless access point 10 (step S144).

When light receiving unit 40 of wireless LAN terminal 12 receives the optical signal (step S110), CPU 62 determines whether or not the optical signal output from optical communication interface 44 represents information necessary for connection to wireless access point 10 (step S112). If CPU 62 determines that the optical signal represents such information (YES at step S112), CPU 62 performs set-up for connection to wireless access point 10 based on the information received at step S110 (step S114). When set-up ends, CPU 62 controls communication unit 46 so that connection to wireless access point 10 is established (step S116).

After the determination as to the information transmitted from wireless LAN terminal 12, CPU 38 of wireless access point 10 performs the log-in process (step S144).

As described above, when the wireless LAN system is installed at a place where entrance of unspecified persons is limited, such as at home, the wireless LAN system in accordance with the present embodiment first communicates identification information and the like using an optical signal, and thereafter performs the log-in process using a radio signal. As the pieces of information are communicated using different media, it becomes easier to guarantee security.

Further, in the wireless LAN system in accordance with the present embodiment, the identification information is communicated by a signal using infrared ray as a medium. When the identification information is to be stored in wireless access point 10, the identification information is not communicated using radio wave. Infrared ray is hardly transmitted through a wall and the like and, therefore, interception of information by a communication apparatus outside the room or house can be prevented. Therefore, leakage of information can effectively be prevented when the system is used at home.

Further, by the wireless LAN system in accordance with the present embodiment, leakage of information can effectively be prevented even if intensity of radio waves is not reduced when the identification information is communicated. If the intensity of radio waves is reduced for communicating identification information, the communication between wireless access point 12 and a wireless LAN terminal 12 (of which log-in has already been complete) communicating with each other at that time point may be disrupted. According to the wireless LAN system in accordance with the present embodiment, such a problem can be avoided.

Further, wireless access point 10 and wireless LAN terminal 12 have marks indicating the light emitting and light receiving positions. Therefore, it is possible for the user to place the light emitting portion and the light receiving portion facing to each other with reference to the marks and, as a result, the communication of identification information to the wireless LAN system in accordance with the present invention becomes easier even if directivity of signals at the optical communication block is increased. This allows higher directivity of signals. The higher directivity of signals better prevents leakage of information.

On wireless access point 10 and wireless LAN terminal 12, operation units for instructing start of communication of the identification information are provided. Thus, the identification information is communicated at a time point intended by the user and, therefore, the leakage of information can be more reliably prevented.

As a result, a terminal, an information relay apparatus and a wireless LAN system that allow automatic setup for wireless connection without requiring troublesome setup operation by the user and capable of well preventing information leakage when used at home can be provided.

As a first modification, at step S130, light receiving unit 20 may start waiting, after an instruction to wait for an optical signal is input through operation unit 34.

As a second modification, the mark formed on housing 39 of wireless access point 10 or housing 64 of wireless LAN terminal 12 may be any mark other than the arrow, such as a circle surrounding light emitting unit 42 or light receiving unit 20. Such a mark need not be a built-in type mark, and it may be printed, or in place of the mark, a position indicating element for indicating the light emitting position or light receiving position such as an LED (Light Emitting Diode) may be provided.

As a third modification, CPU 62 operating as request control unit 80 may determine whether or not log-in through wireless access point 10 is possible based on an optical signal received by the optical communication block from wireless access point 10, in place of the operation requesting connection to wireless access point 10. The determination may be made based on whether ROM 50 stores information of SSID or not. Here, CPU 62 may determine the level of radio waves received from wireless access point 10, in addition to the determination as to whether log-in through wireless access point 10 is possible or not. If the level of radio waves is determined, the process following step S102 is executed when log-in through the wireless access point 10 is impossible and the radio wave level is not lower than a threshold value.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A terminal communicating with an information relay apparatus relaying information to and from a communication apparatus constituting a communication network, comprising:
- a storage unit configured to store identification information;
- an optical communication unit configured to communicate with said information relay apparatus by a signal using infrared ray having wavelength from 0.7 micrometer to 2.5 micrometer as a medium;
- a radio communication unit configured to communicate with said information relay apparatus through a radio signal; and
- a control unit configured to control said optical communication unit and said radio communication unit; wherein said control unit includes
- a request control unit configured to cause said optical communication unit to transmit a start request signal requesting start of communication by said optical communication unit to said information relay apparatus,
- a transmission control unit configured to cause, after transmission of said start request signal, when an information request signal requesting transmission of the identification information is received by said optical communication unit, said optical communication unit to transmit the identification information stored in said storage unit;
- a log-in control unit configured to cause, after transmission of said identification information by said optical communication unit, said radio communication unit to transmit a log-in request and said identification information as a signal, and
- a communication control unit configured to cause, when said radio communication unit receives a signal indicating log-in permission, said radio communication unit to communicate information.

2. A terminal communicating with an information relay apparatus relaying information to and from a communication apparatus constituting a communication network, comprising:
- a storage unit configured to store identification information;
- an optical communication unit configured to communicate with said information relay apparatus by an optical signal;
- a radio communication unit configured to communicate with said information relay apparatus by a radio signal; and
- a control unit configured to control said optical communication unit and said radio communication unit; wherein said control unit includes
- a request control unit configured to cause said optical communication unit to transmit a start request signal requesting start of communication by said optical communication unit to said information relay apparatus,
- a transmission control unit configured to cause, after transmission of said start request signal, when said optical communication unit receives an information request signal requesting transmission of the identification information, said optical communication unit to transmit a signal representing the identification information stored in said storage unit,
- a log-in control unit configured to cause, after said optical communication unit transmitted said identification information, said radio communication unit to transmit a log-in request and said identification information as a signal, and
- a communication control unit configured to cause, when said radio communication unit receives a signal indicating log-in permission, said radio communication unit to communicate information.

3. The terminal according to claim 2, wherein said optical signal includes a signal using infrared ray as a medium.

4. The terminal according to claim 3, wherein said infrared ray has a wavelength from 0.7 micrometer to 2.5 micrometer.

5. The terminal according to claim 2, further comprising a position indicating unit formed to indicate a light emitting position of said optical communication unit.

6. The terminal according to claim 5, wherein said position indicating unit includes a housing formed to house said optical communication unit, having a mark indicating the light emitting position of said optical communication unit.

7. The terminal according to claim 2, further comprising a receiving unit configured to receive an instruction input; wherein said request control unit controls said optical communication unit such that said start request signal is transmitted when an instruction is input to said receiving unit.

8. An information relay apparatus relaying information between a terminal and a communication apparatus constituting a communication network, comprising:
- an optical communication unit configured to communicate with said terminal by an optical signal;
- a storage unit configured to store identification information of said terminal;
- a radio communication unit configured to communicate with said terminal by a radio signal;
- a network communication unit configured to communicate with said communication apparatus; and
- a control unit configured to control said optical communication unit, said storage unit, said radio communication unit and said network communication unit; wherein said control unit includes
- a transmission control unit configured to cause, when a start request signal requesting start of communication by said optical communication unit is received from said terminal, said optical communication unit to transmit an information request signal requesting the identification information of said terminal to said terminal,
- a storage control unit configured to cause said storage unit to store the identification information of said terminal received by said optical communication unit, and
- a relay control unit configured to cause, after said storage unit stored the identification information of said terminal, if said identification information received as a signal of log-in request and said identification information by said radio communication unit and stored in said storage unit matches said identification information received by said radio communication unit, said radio communication unit and said network communication unit to relay information communication between said communication apparatus and said terminal.

9. The information relay apparatus according to claim 8, further comprising a position indicating unit formed to indicate a light receiving position at said optical communication unit.

10. The information relay apparatus according to claim 8, further comprising a receiving unit configured to receive an instruction input; wherein said transmission control unit causes, when said receiving unit receives an instruction input and thereafter receives said start request signal from said terminal, said optical communication unit to transmit said information request signal to said terminal.

* * * * *